T. MURPHY.
Stoves.

No. 149,329. Patented April 7, 1874.

Witnesses.
W. E. Chaffee
W. S. Jewell

Inventor.
Thomas Murphy
By Daniel Breed
Atty

UNITED STATES PATENT OFFICE.

THOMAS MURPHY, OF PARKERSBURG, WEST VIRGINIA.

IMPROVEMENT IN STOVES.

Specification forming part of Letters Patent No. 149,329, dated April 7, 1874; application filed June 26, 1873.

*To all whom it may concern:*

Be it known that I, THOMAS MURPHY, of Parkersburg, in the county of Wood and State of West Virginia, have invented certain new and useful Improvements in Stoves; and I do hereby declare the following to be a full, clear, and exact description of the invention, such as will enable others skilled in the art to which it pertains to make and use it, reference being had to the accompanying drawings, which form part of this specification.

The nature of my invention relates to an improvement in stoves; and it consists in the construction of the meat-broiler, as will be more fully described hereafter.

Figure 1:
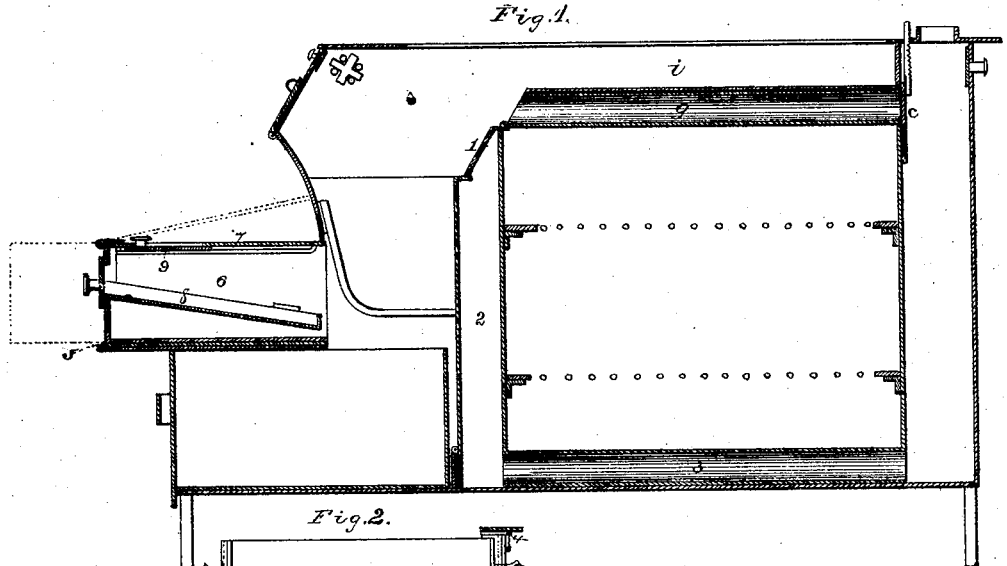
Figure 2:
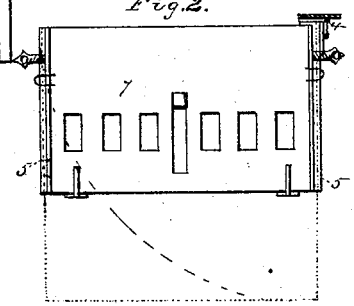

Figure 1 is a longitudinal section of my stove with the broiler attached. Fig. 2 is a plan view of the broiler.

*a* represents the frame of the stove, of ordinary shape and construction. Pivoted to the front of the stove, by the hinge 4, is a plate, 5, which swings freely around, as shown by dotted lines, Fig. 2, having its ends turned up, so as to lap over the flanges formed on the lower edges of the broiler 6. This broiler consists of a frame, having its front side toward the fire entirely open, a hinged cover, 7, and an opening through the rear side, so as to slip in the slide 8, on which the article to be broiled or toasted is placed. The broiler can be moved back and forth on the plate 5, so as to be nearer to or farther from the fire, can be swung around with the plate entirely away from the fire, or can be slipped out of the plate entirely. Through the cover 7 there are a number of openings covered by a slide, 9, so that a person can look through and see whether the article being broiled or toasted is done or not.

When the broiler is not in use, the hinged cover can be raised, as shown in dotted lines, so as to form a blower and create a draft, the screws *o* holding it in any desired position.

Having thus described my invention, what I claim as new, and desire to secure by Letters Patent, is—

1. The broiler 6, having perforated hinged cover 7 and slide 8, substantially as set forth.

2. The combination of the broiler 6 and hinged plate 5, substantially as specified.

In testimony that I claim the foregoing I have hereunto set my hand this 19th day of June, 1873.

THOMAS MURPHY.

Witnesses:
D. H. NEAL,
WILLIAM DILS.